United States Patent
Singh Saini (10) Patent No.: US 11,069,232 B1
(45) Date of Patent: Jul. 20, 2021

(54) SYSTEMS AND METHODS FOR DETERMINING LEVELS OF CONGESTION AT ESTABLISHMENTS

(71) Applicant: TOYOTA MOTOR NORTH AMERICA, INC., Plano, TX (US)

(72) Inventor: Gagandeep Singh Saini, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/744,968

(22) Filed: Jan. 16, 2020

(51) Int. Cl.
  *G08G 1/065* (2006.01)
  *G08G 1/0968* (2006.01)
  *G08G 1/0967* (2006.01)
  *G06N 20/00* (2019.01)

(52) U.S. Cl.
  CPC ....... *G08G 1/065* (2013.01); *G08G 1/096775* (2013.01); *G08G 1/096877* (2013.01); *G06N 20/00* (2019.01)

(58) Field of Classification Search
  None
  See application file for complete search history.

(56) References Cited

U.S. PATENT DOCUMENTS

| | | |
|---|---|---|
| 5,163,000 A | 11/1992 | Rogers et al. |
| 8,259,925 B2 | 9/2012 | Smith et al. |
| 10,217,174 B2 | 2/2019 | Ghosh et al. |
| 10,810,528 B1 * | 10/2020 | Phillips .............. G06Q 20/1085 |
| 10,858,011 B1 * | 12/2020 | Christensen ...... B60W 50/0098 |
| 2009/0055208 A1 | 2/2009 | Kaiser |
| 2011/0208646 A1 * | 8/2011 | McMaster .............. G06Q 20/10 705/39 |
| 2017/0122767 A1 * | 5/2017 | Hetland ................. G01C 21/20 |
| 2018/0144198 A1 | 5/2018 | Funagi |
| 2018/0293595 A1 * | 10/2018 | McMaster ............... H04L 67/22 |
| 2019/0139258 A1 * | 5/2019 | Slattery .................. H04N 7/181 |
| 2019/0147331 A1 * | 5/2019 | Arditi .................. G05D 1/0274 706/20 |
| 2019/0147368 A1 * | 5/2019 | Pinel ..................... G06N 5/022 706/12 |

(Continued)

FOREIGN PATENT DOCUMENTS

| | | | |
|---|---|---|---|
| CN | 104200231 A | * | 12/2014 |
| CN | 108871355 A | * | 11/2018 |
| KR | 101295816 B1 | | 8/2013 |

OTHER PUBLICATIONS

Next-gen online queue management software (https://hate2wait.io/business), accessed Oct. 28, 2019 (Don't have a page count).

(Continued)

*Primary Examiner* — Fekadeselassie Girma
(74) *Attorney, Agent, or Firm* — Dinsmore & Shohl LLP (57) ABSTRACT

Systems and methods for determining a level of congestion and notifying a user of increased wait times are provided. The system includes an electronic control unit configured to determine a number of vehicles at or within a threshold distance of an establishment, determine that the establishment is a destination of a vehicle, and provide a notification in response to determining the number of vehicles at or within the threshold distance of the establishment exceeds a predetermined threshold and determining the establishment is the destination of the vehicle.

14 Claims, 4 Drawing Sheets

(56) References Cited

U.S. PATENT DOCUMENTS

| | | | |
|---|---|---|---|
| 2019/0171208 A1* | 6/2019 | Magalhaes de Matos | ............ G05D 1/0022 |
| 2019/0197430 A1* | 6/2019 | Arditi | ................ G01C 21/3438 |
| 2019/0197798 A1* | 6/2019 | Abari | ..................... G06Q 10/02 |
| 2019/0259182 A1* | 8/2019 | Sarukkai | .............. G06K 9/4628 |
| 2019/0279235 A1* | 9/2019 | Kaneichi | ............. G06Q 10/067 |
| 2019/0340924 A1* | 11/2019 | Abari | ................ G08G 1/09623 |
| 2020/0065711 A1* | 2/2020 | Clement | .................. G06N 3/08 |
| 2020/0082188 A1* | 3/2020 | Singh | ................ G06K 9/00832 |
| 2020/0133745 A1* | 4/2020 | Dugan | .................... G06F 9/542 |
| 2020/0175869 A1* | 6/2020 | Khoo | .............. G08G 1/096844 |
| 2020/0210887 A1* | 7/2020 | Jain | .......................... G01S 7/40 |
| 2020/0378776 A1* | 12/2020 | Omari | ................... G01S 15/931 |
| 2020/0379484 A1* | 12/2020 | Omari | ..................... G01S 15/89 |

OTHER PUBLICATIONS https://www.businessinsider.com/how-google-maps-knows-about-traffic-2015-11—here's how (https://www.businessinsider.com/how-google-maps-knows-about-traffic-2015-11), 11 pages.

* cited by examiner

SYSTEMS AND METHODS FOR DETERMINING LEVELS OF CONGESTION AT ESTABLISHMENTS

TECHNICAL FIELD

The present specification generally relates to systems and methods for determining levels of congestion at establishments and, more specifically, systems and methods for notifying users when increased wait times at establishments should be expected.

BACKGROUND

Improvements in technology are commonly focused around more efficiently making use of a person's time. For example, navigation applications, such as those provided on a mobile device provide navigation instructions that take into consideration construction, accidents, and other delays in order to provide the quickest route to the destination. In addition, these navigation applications may provide information pertaining to the destination, such as contact information, operating hours, and the like. However, these navigation applications are not incorporated into a vehicle in order to notify a user of increased wait times associated with a desired destination. As such, these navigation applications do not provide the necessary notification in order to allow the user to better determine if and when he or she should depart for the destination, or whether the user should continue to the destination once in route.

Accordingly, a need exists for alternative systems and methods for determining when a destination has increased wait times and notifying a user of such increased wait times.

SUMMARY

In one embodiment, a system includes an electronic control unit configured to determine a number of vehicles at or within a threshold distance of an establishment, determine that the establishment is a destination of a vehicle, and provide a notification in response to determining the number of vehicles at or within the threshold distance of the establishment exceeds a predetermined threshold and determining the establishment is the destination of the vehicle.

In another embodiment, a method includes determining a number of vehicles at or within a threshold distance of an establishment, determining that the establishment is a destination of a vehicle, and providing a notification in response to determining the number of vehicles at or within the threshold distance of the establishment exceeds a predetermined threshold and determining the establishment is the destination of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for determining levels of congestion at establishments. The systems and methods of the present specification facilitate determining when vehicles arrive at and depart from establishments in order to determine a level of congestion at the establishments. Embodiments include a system that interfaces with an electronic control device, such as that in a vehicle, in order to notify a user that a level of congestion at an establishment is greater than a predetermined threshold. When the level of congestion at the establishment is greater than the predetermined threshold, the user is notified that a wait time at the establishment may be excessive.

Systems and methods for determining levels of congestion at establishments and notifying a user of excessive wait times will now be described in more detail with reference to the drawings and where like numbers refer to like structures.

Figure 1:
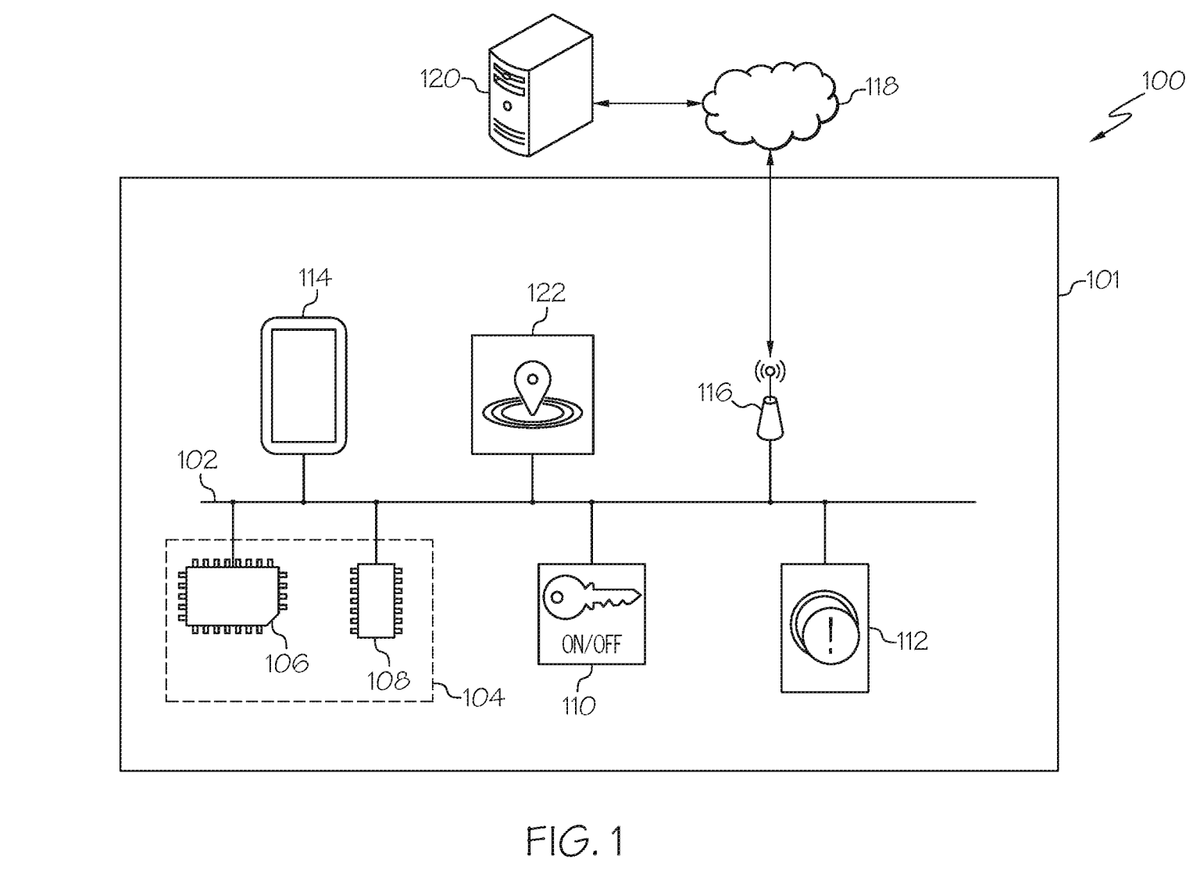
FIG. 1 schematically depicts components of a system for determining a level of congestion at an establishment and notifying a user when the level of congestion at the establishment exceeds a predetermined threshold, according to one or more embodiments shown and described herein.

FIG. 1 schematically depicts components of a system 100 for determining a level of congestion at establishments and notifying a user when the level of congestion at an establishment exceeds a predetermined threshold. It is to be appreciated that the system 100 may be implemented in any suitable device. Throughout the ensuing description, the device will be referred to as a vehicle 101. Thus, as discussed herein, the system 100 will be described with reference to being carried out in a vehicle 101. The system 100 for determining a level of congestion at establishments and notifying a user in the vehicle 101 of excessive wait times at an establishment includes a communication path 102, an electronic control unit 104 having a processor 106 and a non-transitory computer readable memory 108, an ignition switch 110, a notification device 112, a navigation unit 114, a global positioning system (GPS) unit 122, and network interface hardware 116. The system 100 may be communicatively coupled to a network 118 by way of the network interface hardware 116. The components of the system 100 are contained within or mounted to the vehicle 101. The various components of the system 100 and the interaction thereof will be described in detail below.

Referring to the system 100, the communication path 102 may be formed from any medium that is capable of transmitting a signal such as, for example, conductive wires, conductive traces, optical waveguides, or the like. The communication path 102 may also refer to the expanse in which electromagnetic radiation and their corresponding electromagnetic waves traverses. Moreover, the communication path 102 may be formed from a combination of mediums capable of transmitting signals. In one embodiment, the communication path 102 comprises a combination of conductive traces, conductive wires, connectors, and buses that cooperate to permit the transmission of electrical data signals to components such as processors, memories, sensors, input devices, output devices, and communication devices. Accordingly, the communication path 102 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 102 communicatively couples the various components of the system. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 104 may be any device or combination of components comprising the processor 106 and the non-transitory computer readable memory 108. The processor 106 of the system 100 may be any device capable of executing the machine-readable instruction set stored in the non-transitory computer readable memory 108. Accordingly, the processor 106 may be an electric controller, an integrated circuit, a microchip, a computer, or any other computing device. The processor 106 is communicatively coupled to the other components of the vehicle 101 by the communication path 102. Accordingly, the communication path 102 may communicatively couple any number of processors with one another, and allow the components coupled to the communication path 102 to operate in a distributed computing environment. Specifically, each of the components may operate as a node that may send and/or receive data. While the embodiment depicted in FIG. 1 includes a single processor, other embodiments may include more than one processor.

The non-transitory computer readable memory 108 of the system 100 is coupled to the communication path 102 and communicatively coupled to the processor 106. The non-transitory computer readable memory 108 may comprise RAM, ROM, flash memories, hard drives, or any non-transitory memory device capable of storing machine-readable instructions such that the machine-readable instructions can be accessed and executed by the processor 106. The machine-readable instruction set may comprise logic or algorithm(s) written in any programming language of any generation (e.g., 1GL, 2GL, 3GL, 4GL, or 5GL) such as, for example, machine language that may be directly executed by the processor 106, or assembly language, object-oriented programming (OOP), scripting languages, microcode, etc., that may be compiled or assembled into machine readable instructions and stored in the non-transitory computer readable memory 108. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 108, other embodiments may include more than one memory module.

As noted above, the vehicle 101 includes an ignition switch 110 coupled to the communication path 102. The ignition switch 110 may be any device capable of turning the vehicle 101 ON or OFF. In some embodiments, the ignition switch 110 is a keyed switch, a keyless switch, a wireless switch, a push button, or the like. When communicatively coupled to the electronic control unit 104, the ignition switch 110 generates a signal indicating the state in which the ignition switch 110 is set. The ignition switch 110 may have two or more set positions. For example, but without limitation the ignition switch 110 may have an OFF position, an ON position, or others. The OFF position, for example, corresponds to turning the engine of the vehicle 101 OFF and the ON position corresponds to the running state of the vehicle 101 in which the engine of the vehicle 101 is turned on.

The notification device 112 of the vehicle 101 is coupled to the communication path 102. The notification device 112 may be any device capable of providing visual and/or audible feedback to a user. The notification device 112 may include a display device, an audible device, such as a speaker, or the like.

In some embodiments, the notification device 112 includes a display device for outputting the notification from the notification device 112. The display device may include any medium capable of transmitting an optical output such as, for example, a cathode ray tube, light emitting diodes, a liquid crystal display, a plasma display, or the like. Moreover, the display device may be a touchscreen that, in addition to providing optical information, detects the presence and location of a tactile input upon a surface of or adjacent to the display device. Accordingly, the display device may receive mechanical input directly upon the optical output provided by the display device. In some embodiments, the display device may be configured to provide one or more user interfaces and may be configured as a touch screen and/or include other features for receiving user input.

The vehicle 101 includes the navigation unit 114 coupled to the communication path 102. The navigation unit 114 may be utilized for entering or inputting location information of an establishment, such as a predetermined destination, and storing route data. The navigation unit 114 may be incorporated into the display device, if provided, or may be a separate device allowing the user to enter a destination.

Still referring to FIG. 1, the system 100 includes network interface hardware 116 coupled to the communication path 102. The network interface hardware 116 may be any device capable of transmitting and/or receiving data via a network 118. Accordingly, network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. In another embodiment, the network interface hardware 116 may include a Bluetooth send/receive module for sending and receiving Bluetooth communications to/from the network 118. The network interface hardware 116 may also include a radio frequency identification ("RFID") reader configured to interrogate and read RFID tags.

The vehicle 101 is communicatively coupled to a server 120 via the network 118. In some embodiments, the network 118 is a personal area network that utilizes the network 118 may include one or more computer networks (e.g., a personal area network, a local area network, or a wide area network), cellular networks, satellite networks and/or a global positioning system and combinations thereof. Accordingly, the vehicle 101 can be communicatively coupled to the network 118 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The server 120 includes a database including a listing of establishments such as, for example, restaurants, retail stores, and the like. Each establishment in the database is assigned a predetermined threshold. The predetermined threshold is a value corresponding to a number of vehicles above which a level of congestion at the establishment is determined to result in excessive wait times and delay at the establishment. The server 120 also determines a level of congestion of each establishment, as discussed below, which is regularly updated based on a signal sent from the vehicle 101, as well as other vehicles communicating with the server 120.

In some embodiments, the vehicle 101 includes a global positioning system (GPS) unit 122 coupled to the communication path 102. The GPS unit 122 detects location data of the vehicle 101 and, in some embodiments, day and time information. The GPS unit 122 may be coupled to the navigation unit 114 in order to provide navigation instructions to the destination entered into the navigation unit 114.

The following sections will now describe embodiments of the operation of the system for determining a level of congestion at an establishment.

Figure 2:
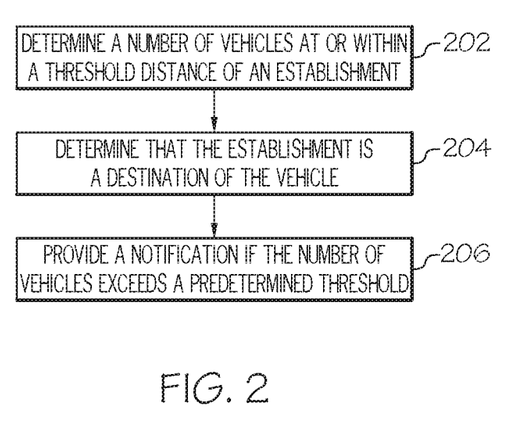
FIG. 2 depicts an illustrative method for determining a level of congestion at an establishment utilizing the system of FIG. 1, according to one or more embodiments shown and described herein.

Referring now to FIG. 2, a method is generally shown for providing a notification when an increased wait time at an establishment should be expected. At step 202, the system 100 determines a number of vehicles at or within a threshold distance of an establishment. As discussed in more detail below with regard to the method discussed in FIG. 3, in some embodiments, the number of vehicles at an establishment may be determined based on an intended destination provided on the navigation unit 114. For example, the user may input an address or other search criteria, such as a store name or category, into the navigation unit 114. The intended destination is stored in the memory 108 of the vehicle 101 and identified as the establishment when the vehicle arrives.

In other embodiments, when the vehicle includes the GPS unit 122, the destination may be determined based on a location of the vehicle 101. More particularly, the establishment may be determined when the vehicle 101 is within a threshold distance of the establishment. The threshold distance may be determined based on a size of a parking lot at the establishment, which is stored within the server 120. Thus, each establishment within the database may have a different associated threshold distance.

The number of vehicles at the establishment corresponds to a level of congestion at the establishment. Thus, as the number of vehicles at the establishment increases and vehicle arrive at the establishment, the level of congestion of the establishment increases. Similarly, as the number of vehicles at the establishment decreases and vehicles depart from the establishment, the level of congestion at the establishment decreases.

At step 204, the system 100 determines that the establishment identified in step 202 is a destination of the vehicle 101. As discussed in more detail below with regard to step 402 of FIG. 4, the system 100 identifies that a destination of the vehicle 101 is one of the establishments in the database of the server 120. The desired establishment is determined based on a user-specified location provided on the navigation unit 114. For example, the user may input an address or other search criteria, such as a store name or category, into the navigation unit 114.

As noted above, each establishment in the database is assigned a predetermined threshold. The predetermined threshold corresponds to a number of vehicles above which is likely to result in excessive wait times and delay at the establishment. Thus, at step 206, the system 100 provides a notification to the vehicle 101 in response to determining the number of vehicles at or within the threshold distance of the establishment, determined in step 202, exceeds a predetermined threshold and determining the establishment is the destination, provided in step 204, of the vehicle 101. The notification may be displayed, audibly output, or the like by the notification device 112.

Figure 3:
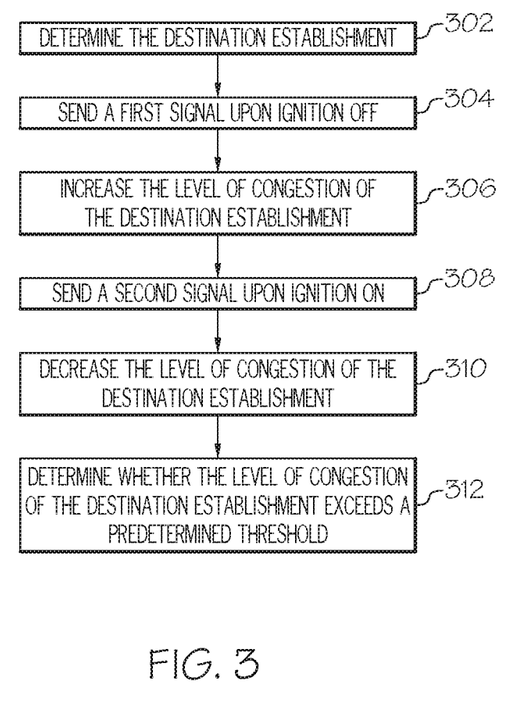
FIG. 3 depicts an illustrative method for determining a level of congestion at an establishment utilizing the system of FIG. 1, according to one or more embodiments shown and described herein.

Referring now to FIG. 3, a method is shown for specifically determining the number of vehicles at the establishments provided within the database of the server 120 and, thus, the associated level of congestion at each establishment. At step 302, an establishment, referred to herein as a "destination establishment" at which the vehicle 101 is arriving is determined. As noted above, in some embodiments, the destination establishment is determined based on a user-specified location provided on the navigation unit 114. For example, the user may input an address or other search criteria, such as a store name or category, into the navigation unit 114. The destination establishment is stored in the memory 108 of the vehicle 101. When the vehicle includes the GPS unit 122, the GPS unit 122 provides navigation instructions, which may be displayed on the display device, for assisting the user in navigating to the destination establishment.

In some embodiments, as noted above, when no user input is provided to determine the destination establishment, the destination address is determined based on information provided by the GPS unit 122 of the vehicle 101 when the ignition switch 110 is turned to the OFF position. Specifically, the GPS unit 122 monitors the location of the vehicle 101 and will identify the destination establishment as being an establishment within a specified proximity of the vehicle 101 when the ignition switch 110 of the vehicle 101 is turned to the OFF position. For purposes discussed herein, it is understood that when the ignition switch 110 is turned to the OFF position, the vehicle 101 has arrived at a destination establishment. In situations in which it cannot be determined which location is the destination establishment, such as in a shopping complex when there are multiple establishments near the vehicle 101 when the ignition switch 110 is turned to the OFF position, a plurality of destinations may be identified as the destination establishment.

As step 304, a first signal is sent from the vehicle 101 to the server 120 when the ignition switch 110 of the vehicle 101 is turned to the OFF position. The first signal includes the identity of the destination establishment, or each destination establishment when a single destination establishment cannot be determined, identified by the navigation unit 114 or the GPS unit 122, as discussed above. The first signal may further include day and time information of when the ignition switch 110 of the vehicle 101 was turned to the OFF position.

As discussed above, the server 120 includes a database including a listing of establishments, and each establishment is assigned a predetermined threshold. It is determined that when a level of congestion exceeds a predetermined threshold, an excess wait time at the establishment should be expected. The server 120 determines the level of congestion at each establishment by increasing or decreasing the level of congestion of each establishment as a signal is received from the vehicle 101, as well as other vehicles, communicating with the server 120. At step 306, the server 120 receives the first signal, which indicates the vehicle 101 has parked (the ignition switch 110 is turned to the OFF position) at the destination establishment. As such, the server 120 increases the level of congestion of the destination establishment in the database.

At step 308, a second signal is sent from the vehicle 101 to the server 120 when the ignition switch 110 of the vehicle 101 is turned to the ON position. For purposes discussed herein, it is understood that when the ignition switch 110 is turned to the ON position, the vehicle 101 is departing from the destination establishment. The second signal includes the identity of the destination establishment identified in step 302. The second signal may also include day and time information of when the ignition switch 110 of the vehicle 101 was turned to the ON position.

At step 310, the server 120 receives the second signal, which indicates that the vehicle 101 has left the destination establishment. As such, the server 120 decreases the level of congestion of the destination establishment.

At step 312, the server 120 factors in the first and second signals from each vehicle communicating with the server with respect to each of the establishments in the database. As a result, the server 120 constantly increases and decreases the level of congestion at each establishment in order to determine real-time congestion levels at each establishment in the database based on the first and second signals sent from the vehicles. In addition, the server 120 determines whether the level of congestion exceeds a predetermined threshold for each establishment. Thus, the system 100 is capable of notifying a user when the user may experience increased wait times at a desired establishment based on whether the predetermined threshold of the established is exceeded.

As discussed herein, the term "desired establishment" is intended to be understood as an establishment to which a user intends to navigate. As used herein, the desired establishment differs from the destination establishment as the user does not necessarily enter or input information regarding the destination establishment. As discussed herein, the destination establishment may be determined based on the location of the vehicle 101. However, the desired establishment is entered by the user prior to arrival in order to obtain navigation information, as well as congestion or wait time information, prior to departing for the desired establishment.

Figure 4:
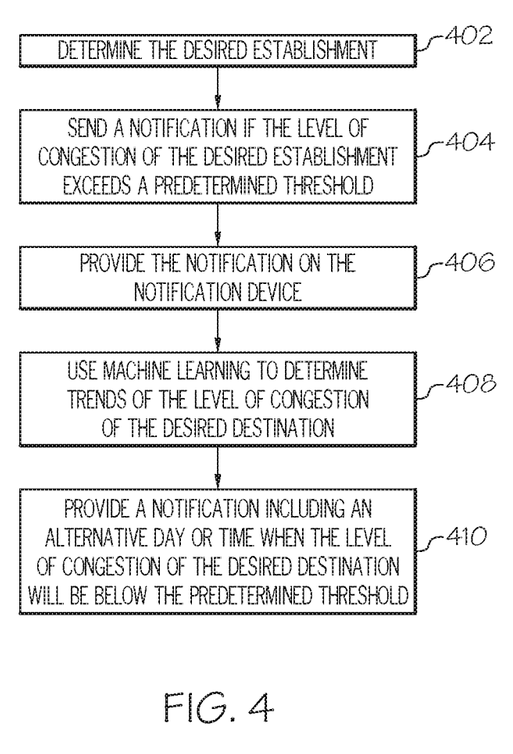
FIG. 4 depicts an illustrative method for notifying a user when a level of congestion at an establishment exceeds a predetermined threshold utilizing the system of FIG. 1, according to one or more embodiments shown and described herein.

Referring now to FIG. 4, a method is shown for specifically providing a notification to the vehicle 101 when the number of vehicles at the destination exceeds the predetermined threshold as determined in step 312 of FIG. 3. At step 402, the establishment, referred to herein as a "desired establishment" is determined. As discussed herein, the desired establishment is determined based on a user-specified location provided on the navigation unit 114. For example, the user may input an address or other search criteria, such as a store name or category, into the navigation unit 114.

At step 404, the vehicle 101 sends a signal to the server 120 including the identity of the desired establishment. Based on the above disclosure of the server 120 determining the level of congestion at the establishments in the database at step 312, the server 120 determines if the level of congestion at the desired establishment exceeds the predetermined threshold. When the server 120 determines that the level of congestion at the desired establishment exceeds the predetermined threshold, the server 120 sends a signal to the vehicle 101 that the level of congestion at the desired establishment exceeds the predetermined threshold.

In some embodiments, when the level of congestion does not exceed the predetermined threshold, the server 120 may send a signal to the vehicle 101 that the level of congestion does not exceed the predetermined threshold. In other embodiments, when the level of congestion does not exceed the predetermined threshold, the server 120 may not send a signal to the vehicle 101.

In some embodiments, the server 120 will send a signal to the vehicle 101 including specific information pertaining to the level of congestion even if the level of congestion does not exceed the predetermined threshold. This information may be useful to the user in order to determine if the level of congestion may increase or decrease in the immediate future.

At step 406, based on the signal sent from the server 120 to the vehicle 101, a corresponding notification will be provided on the notification device 112 of the vehicle 101. For example, when the signal sent from the server 120 indicates that the level of congestion of the desired establishment exceeds the predetermined threshold, the notification device 112 will provide a notification indicating that longer wait times at the desired establishment should be expected. The notification may be provided in the form of a visual display on the display unit and/or an audible notification through a speaker system of the vehicle 101. As discussed in more detail below, the notification may also include information based on the level of congestion provided from the server 120 in order to inform the user of previous and/or future trends of the level of congestion of the desired establishment. This may be useful in allowing the user to determine a level of congestion of the desired establishment in the immediate future. If the server determines that the level of congestion does not exceed the predetermined threshold, as discussed above, the notification device 112 may provide a notification indicating that shorter wait times at the desired establishment should be expected. In either instance, the notification may include specific a specific length of the wait time in minutes or hours.

In addition to providing a level of congestion for the desired establishment, the system 100 disclosed herein is capable of using machine learning to determine a suitable alternative day and/or time at which the level of congestion will be below the predetermined threshold. At step 408, the server 120 analyzes previous levels of congestion of the establishments to identify trends in congestion levels at each establishment in the database. For example, the server 120 may determine that the level of congestion at each establishment is below the predetermined threshold on certain days or at certain times. Similarly, the server 120 may determine that the level of congestion at each establishment is above the predetermined threshold on certain days or at certain times. This information is utilized to formulate predicted levels of congestion at each establishment at future days and times.

Based on the trends determined by the server 120 in step 408, the notification sent to the vehicle 101 from the server 120 in step 404 may include suggested alternative days or times for the user. Thus, at step 410, the notification provided by the vehicle 101 may also include information on the notification device 112 including a suggested alternative day and/or time for going to the desired establishment. For example, the notification may suggest waiting an hour to go to the desired establishment or, instead, going to the desired establishment the following day. The user may accept or decline the suggested alternative in the notification. If the user declines the suggested alternative, the system 100 may provide navigation instructions via the navigation unit 114 to the user for navigating to the desired establishment.

From the above, it is to be appreciated that defined herein is a system and method for determining when an establishment has an increased wait time and notifying a user of such increased wait time, thereby allowing the user to better plan and minimize wasted time.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
an electronic control unit configured to:
   determine a number of vehicles at or within a threshold distance of an establishment corresponding to a level of congestion at the establishment;
   determine that the establishment is a destination of a vehicle;
   provide a notification in response to determining the number of vehicles at or within the threshold distance of the establishment exceeds a predetermined threshold and determining the establishment is the destination of the vehicle;
   send a first signal when an ignition switch is operated to an OFF position to increase the level of congestion at the establishment; and
   send a second signal when the ignition switch is operated to an ON position to decrease the level of congestion at the establishment.

2. The system of claim 1, wherein the vehicle further comprises a notification device, the notification device including at least one of a visual display and an audible device.

3. The system of claim 1, wherein the notification identifies that excessive wait times at the establishment should be expected when the level of congestion at the establishment exceeds the predetermined threshold.

4. The system of claim 1, wherein the system is configured to identify trends of the levels of congestion at the establishment based on machine learning, the notification providing a suggested alternative at which the level of congestion at the establishment will be below the threshold.

5. The system of claim 1, wherein the vehicle further comprises a GPS unit, the establishment being determined based on a location of the GPS unit.

6. The system of claim 1, further comprising a navigation unit, the establishment being determined based on a user input on the navigation unit.

7. The system of claim 6, wherein the notification is provided upon the establishment being determined by the user input on the navigation unit.

8. The system of claim 1, wherein the first signal and the second signal include at least one of day information and time information.

9. A method comprising:
   determining a number of vehicles at or within a threshold distance of an establishment corresponding to a level of congestion at the establishment;
   determining that the establishment is a destination of a vehicle;
   providing a notification in response to determining the number of vehicles at or within the threshold distance of the establishment exceeds a predetermined threshold and determining the establishment is the destination of the vehicle;
   sending a first signal when an ignition switch is operated to an OFF position to increase the level of congestion at an establishment; and
   sending a second signal when the ignition switch is operated to an ON position to decrease the level of congestion at the establishment.

10. The method of claim 9, wherein the notification is provided to a notification device when the level of congestion at the establishment exceeds a predetermined threshold.

11. The method of claim 9, further comprising:
   identifying trends of the levels of congestion at the establishment based on machine learning; and
   providing a suggested alternative at which the level of congestion at the establishment will be below the threshold.

12. The method of claim 9, further comprising determining the establishment based on a location of a GPS unit.

13. The method of claim 9, further comprising determining the establishment based on user input on a navigation unit.

14. The method of claim 9, wherein the first signal and the second signal include at least one of day information and time information.

* * * * *